US012640502B2

(12) United States Patent
Kropiewnicki et al.

(10) Patent No.: US 12,640,502 B2
(45) Date of Patent: May 26, 2026

(54) CONTACT SPRING ARRANGEMENT WITH RELEASE MEMBER

(71) Applicant: HARTING Electric Stiftung & Co. KG, Espelkamp (DE)

(72) Inventors: Norbert Kropiewnicki, Bielefeld (DE); Daniel Wesseler, Georgsmarienhütte (DE)

(73) Assignee: HARTING Electric Stiftung & Co. KG, Espelkamp (DE)

( * ) Notice: Subject to any disclaimer, the term of this patent is extended or adjusted under 35 U.S.C. 154(b) by 218 days.

(21) Appl. No.: 18/282,521

(22) PCT Filed: Mar. 28, 2022

(86) PCT No.: PCT/DE2022/100234
§ 371 (c)(1),
(2) Date: Sep. 16, 2023

(87) PCT Pub. No.: WO2022/218467
PCT Pub. Date: Oct. 20, 2022

(65) Prior Publication Data

US 2024/0145946 A1 May 2, 2024

(30) Foreign Application Priority Data

Apr. 16, 2021 (DE) ..................... 10 2021 109 581.6

(51) Int. Cl.
*H01R 4/48* (2006.01)

(52) U.S. Cl.
CPC ......... *H01R 4/4809* (2013.01); *H01R 4/4833* (2023.08); *H01R 4/4821* (2023.08)

(58) Field of Classification Search
CPC ... H01R 4/4809; H01R 4/4833; H01R 4/4821
(Continued)

(56) References Cited

U.S. PATENT DOCUMENTS 6,851,967 B2 2/2005 Miyoshi et al.
8,251,738 B2 8/2012 Heckert et al.
(Continued)

FOREIGN PATENT DOCUMENTS

DE 20205821 U1 8/2003
DE 102005028063 10/2006
(Continued)

OTHER PUBLICATIONS

Kropiewnicki et al., "Clamping spring-type contact device having an overstretch prevention mechanism, and plug connector insert having at least one such clamping spring-type contact device", co-pending U.S. Appl. No. 18/282,524, which is a national phase of PCT/DE2022/100233.

*Primary Examiner* — Tulsidas C Patel
*Assistant Examiner* — Thaslimur Rahman
(74) *Attorney, Agent, or Firm* — Smartpat PLC

(57) ABSTRACT

A contact spring arrangement includes a carrier structure which has a support wall made of a conductive material. A contact spring has a base limb, held in a fixed position with respect to the support wall, and a clamping limb which, together with the support wall, forms a plug socket narrowing in the insertion direction for a core of an electrical conductor. A release member is guided displaceably in a guide body in the insertion direction with respect to the support wall and has an actuation arm which, in a release position, engages on a flank of the clamping limb facing towards the plug socket and holds the clamping limb, counter to the spring force, in a position bent back towards the base limb. The carrier structure forms a stop which limits the range of movement of the release member in the insertion direction.

5 Claims, 4 Drawing Sheets

(58) Field of Classification Search
USPC .......................................................... 439/729
See application file for complete search history.

(56) References Cited

U.S. PATENT DOCUMENTS

| | | | | |
|---|---|---|---|---|
| 10,297,930 | B2 | 5/2019 | Wu et al. | |
| 2003/0194918 | A1* | 10/2003 | Fricke .................... | H01R 4/484 439/835 |
| 2007/0099479 | A1 | 5/2007 | Holterhoff et al. | |
| 2012/0028513 | A1 | 2/2012 | Feye-Hohmann | |
| 2017/0012368 | A1* | 1/2017 | Aboulkassem ...... | H01R 4/4833 |
| 2020/0067212 | A1* | 2/2020 | Koellmann .......... | H01R 4/4821 |
| 2021/0057830 | A1* | 2/2021 | Fehling ................ | H01R 9/2408 |

FOREIGN PATENT DOCUMENTS

| | | | |
|---|---|---|---|
| DE | 202006009460 | U1 | 3/2007 |
| DE | 102008032837 | A1 | 1/2010 |
| DE | 202012103314 | U1 | 12/2013 |
| DE | 102017106720 | A1 | 10/2018 |
| DE | 202019101246 | U1 | 6/2019 |
| DE | 102020122135 | A1 | 3/2021 |
| DE | 102020123141 | A1 | 3/2021 |
| EP | 0336139 | A2 | 10/1993 |
| EP | 2457289 | B1 | 5/2012 |
| EP | 3116065 | A1 | 1/2017 |
| KR | 20180078239 | A | 7/2018 |
| WO | 2018178164 | A1 | 10/2018 |

* cited by examiner

CONTACT SPRING ARRANGEMENT WITH RELEASE MEMBER

CROSS-REFERENCE TO RELATED APPLICATION

This application is a national stage application, filed under 35 U.S.C. § 371, of International Patent Application PCT/DE2022/100234, filed on Mar. 28, 2022, which claims the benefit of German Patent Application DE 10 2021 109 581.6, filed on Apr. 16, 2021.

BACKGROUND

An example of a contact spring arrangement is described in DE 20 2006 009 460 U1. The support wall can be part of a conductive structure, for example a busbar or a plug connector contact. In order to bring the core of the conductor into contact with this structure, an insulated end of the core (for example a copper core) is inserted into the plug socket. The end of the core slides onto the flank of the clamping limb and deflects this clamping limb. Due to the resilient restoring force of the spring, a gripping edge formed at the free end of the clamping limb digs into the peripheral surface of the copper core. If an attempt is now made to pull back the conductor, the force exerted by the core on the gripping edge has the tendency to pivot the clamping limb further in the direction of the support wall and to push the clamping limb even more tightly against the core, so that the core is held in position in a self-locking manner.

In order to release the contact again, the release member is displaced in the insertion direction so that its actuation arm collides with the flank of the clamping limb and bends it back. As a result, the core of the conductor is released so that the conductor can be pulled back out of the plug socket.

It is disclosed, for example, in U.S. Pat. No. 10,297,930 B2 to limit the spring path of the contact spring by support structures, so that an overstretching of the spring is prevented.

The German Patent and Trademark Office has researched the following prior art in the priority application for the present application: DE 10 2017 106 720 A1, DE 10 2020 122 135 A1, DE 10 2020 123 141 A1, DE 202 05 821 U1, DE 20 2006 009 460 U1, DE 20 2012 103 314 U1, U.S. Pat. No. 10,297,930 B2 and EP 3 116 065 A1.

SUMMARY

The disclosure relates to a contact spring arrangement having a carrier structure which has a support wall made of a conductive material, a contact spring which has a base limb held in a fixed position with respect to the support wall, and a clamping limb which, together with the support wall, forms a plug socket narrowing in the insertion direction for a core of an electrical conductor. The arrangement includes a release member which is guided displaceably in a guide body in the insertion direction with respect to the support wall and which has an actuation arm which, in a release position, engages on a flank of the clamping limb facing towards the plug socket and holds the clamping limb, counter to the spring force, in a position bent back towards the base limb.

It is an object of the disclosure to provide a contact spring arrangement in which the contact spring is more securely protected against overstretching.

This object is achieved by the carrier structure forming a stop which limits the range of movement of the release member in the insertion direction.

Since conventional support structures act directly on the contact spring and the actuation arm acts at a different point on the contact spring, when a high force is exerted on the release member it can still result in a significant bending moment and thus to an overstretching of the part of the contact spring which is subjected to this bending moment. The bending moment exerted by the release member is limited by the stop restricting the range of movement of the release member such that an excessive deflection of the spring cannot occur in the first place. Support structures which act directly on the spring are thus no longer required. Thus at the same time the construction of the contact spring arrangement is simplified.

Exemplary embodiments are explained in more detail hereinafter by way of the drawing.

DETAILED DESCRIPTION

Figure 1:
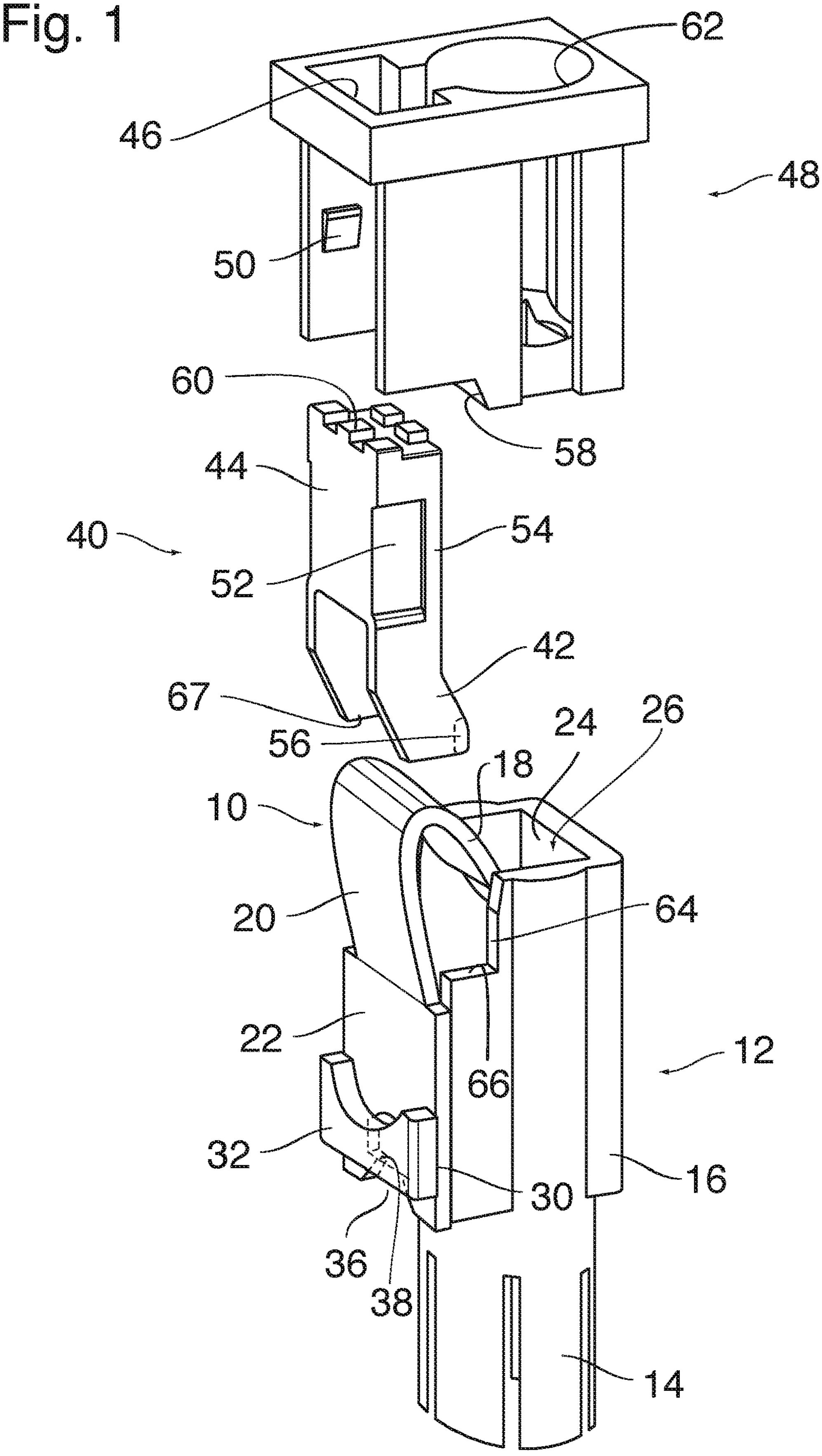
FIG. 1 shows a perspective exploded view of a contact spring arrangement.

The contact spring arrangement shown in FIG. 1 has a contact spring 10 made of metal and an electrically conductive carrier structure 12 which in the example shown forms a socket contact 14 and a cage 16 which axially adjoins thereto and which is also denoted as a busbar. The contact spring 10 has a clamping limb 18 and a base limb 20 which is connected to the clamping limb 18 via a U-shaped bow and which transitions into a flat holding limb 22 at the opposing end.

The contact spring 10 is held on the cage 16 by its holding limb 22 such that the clamping limb 18 protrudes obliquely into the interior of the cage and, together with a support wall 24 of the cage opposing the contact spring, forms a plug socket 26 for an electrical conductor 28 (FIG. 5) which is mechanically fixed in the cage and electrically connected to the carrier structure 12 in this manner. The conductor 28, for example a copper core of a cable 29, is clampingly held between the clamping limb 18 and the support wall 24, and, since the clamping limb acts obliquely on the conductor, the conductor is fixed in a self-locking manner in the cage when a pulling force acts on the conductor 28 in the pull-out direction.

The cage 16 forms on the side opposing the support wall 24 a receiving duct 30 which extends in the insertion direction of the plug socket 24 and into which the holding limb 22 of the contact spring 10, which is designed in a fork-shaped manner, is inserted from above in FIG. 1. The receiving duct 30 is formed by two parallel grooves in the outer surfaces of the cage 16, which are defined on the side remote from the plug socket by a bracket 32. This bracket is connected to the main part of the cage 16 simply via a projection 34 which extends through a slot 36 between the fork arms of the holding limb 22. The contact spring can be fixed in any suitable manner to the carrier structure, for example by riveting. In the example shown here, the fork arms of the holding limb 22 in each case form in the region of their free end two latching lugs 38 which are oriented toward one another and which engage below the projection 34 and thus fix the holding limb 22 in a latching manner in the receiving duct 30.

In the example shown here, the contact spring arrangement forms a so-called push-in contact in which the conductor which is clamped between the support wall 24 and the clamping limb 18 is secured in the clamped position in a self-locking manner. Thus a specific release element 40 is provided for releasing the clamping, the release element being able to be displaced in the direction parallel to the insertion direction defined by the plug socket 26 (vertically in the drawing) and having an actuation arm 42 which has two fork arms and a spring contact bar 56 connecting the fork arms on the end side. If the release element is moved downwardly, the spring contact bar 56 collides with the clamping limb 18 of the contact spring and bends back this clamping limb 18 in the direction of the base limb 20 so that the conductor 28 is released.

The release member 40 has a cuboidal sliding body 44 which is displaceably guided in a guide duct 46 of a guide body 48. Two wedge-shaped, downwardly tapering latching springs or latching lugs 50, which in the assembled state engage in two receiving recesses 52 in the side walls of the sliding body 44, are formed on two opposing walls of the receiving duct 46. Each receiving recess 52 is defined in the direction transversely to the sliding direction by a fixing web 54 which runs spaced apart from a lateral edge of the associated latching lug 50.

As already mentioned, the actuation arm 42 has the two aforementioned fork arms which protrude from the lower end of the sliding body 44 and which are flush with the side walls of the cage 16 and encompass the contact spring 10 in the manner of a yoke. At the free end the fork arms are connected by the spring contact bar 56 which extends transversely over the clamping limb 18 of the contact spring and thus is able to exert a bending moment onto the clamping limb. The actuation arm 42 is angled back obliquely relative to the sliding body 44 and thus exits downwardly from the cross section of the guide duct 46 and engages behind an undercut 58 formed on the guide body 48. As a result, the movement play of the release member 40 is limited upwardly in FIG. 1.

A tool handle 60 in the form of a slot for a screwdriver blade is formed at the upper end of the sliding body 44, the release member 40 being able to be pushed thereby deeper into the guide duct 46 counter to the force of the contact spring 10.

The guide body 48 is manufactured from electrically insulating material and forms a cable guide 62, which runs parallel to the guide duct 46, for the conductor 28 which is designed to be brought into contact by the contact spring 10.

During assembly, the release member 40 is inserted in a linear movement parallel to the insertion direction of the plug socket 26 from below into the guide duct 46. The latching lugs 50 configured in a wedge-shaped manner or the walls which bear the latching lugs are temporarily resiliently deformed until the latching lugs engage in the receiving recesses 52. The release member is then movably but captively held on the guide body 48. In a further assembly step, the carrier structure 12 and the guide body 48 are then connected together by a connecting means, which is not shown here, such that the plug socket 26 is oriented with the cable guide 62 and is directly adjacent thereto. As a result, at the same time it is ensured that the release member 40 adopts the correct position relative to the contact spring 10 in the plane transversely to the insertion direction.

Figure 2:
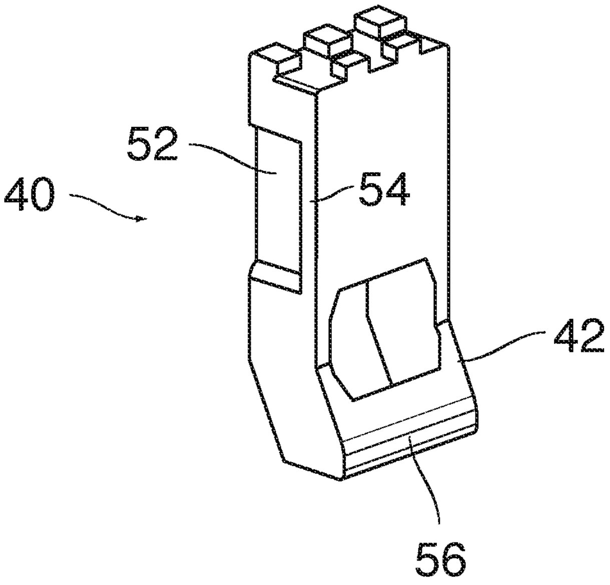
FIG. 2 shows a perspective view of a release member of the contact spring arrangement from a different viewing angle.

FIG. 2 shows the release member 40 from a slightly different perspective so that the spring contact bar 56 can be more clearly identified.

Figure 3:
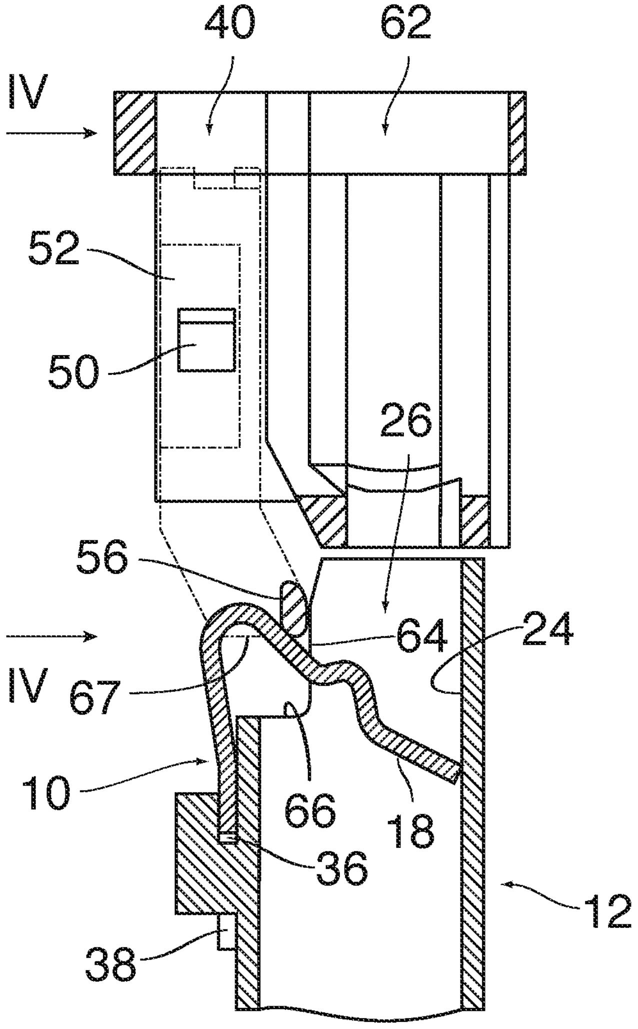
FIG. 3 shows an axial partial section through the contact spring arrangement in the assembled state.

In FIG. 3 the contact spring arrangement (without the socket contact) is shown in the assembled state, wherein for reasons of clarity, however, the contour of the release member 40 is indicated merely by dashed-dotted lines. Only the spring contact bar 56 is shown in section.

Figure 4:
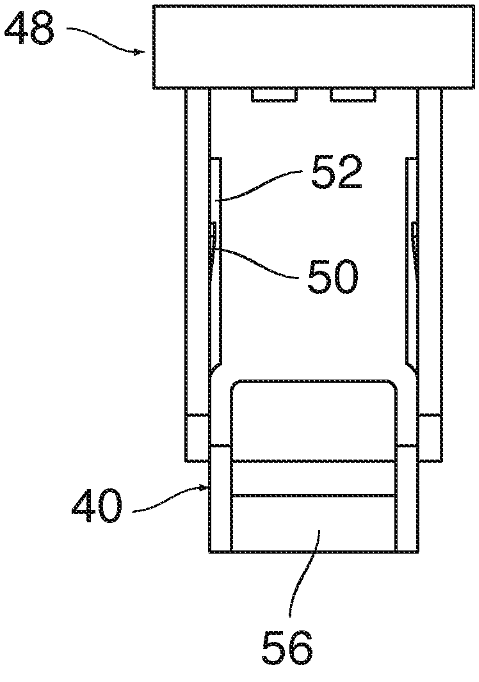
FIG. 4 shows a view of a guide body and the release member from the direction of the arrows IV-IV in FIG. 3.

In the state shown in FIG. 3 the spring contact bar 56 is positioned loosely on the clamping limb 18 of the contact spring such that the contact spring bears with its free end under slight tension against the support wall 24. The clamping limb 18 drops obliquely toward the support wall 24 and defines the plug socket 26 both to the side and downwardly. The latching lugs 50 in this state are located with play both upwardly and downwardly in the receiving recesses 52, as can also be identified in the front view in FIG. 4.

The side walls of the cage 16 have at the upper end a stepped contour and thus form a vertical guide 64 and a stop 66 for the fork arms of the actuation arm 42. The movement of the release member 40 is limited downwardly by the stop 66. The latching lugs 50 do not contribute to the limitation of this movement play and thus are not subjected to load.

Figure 5:
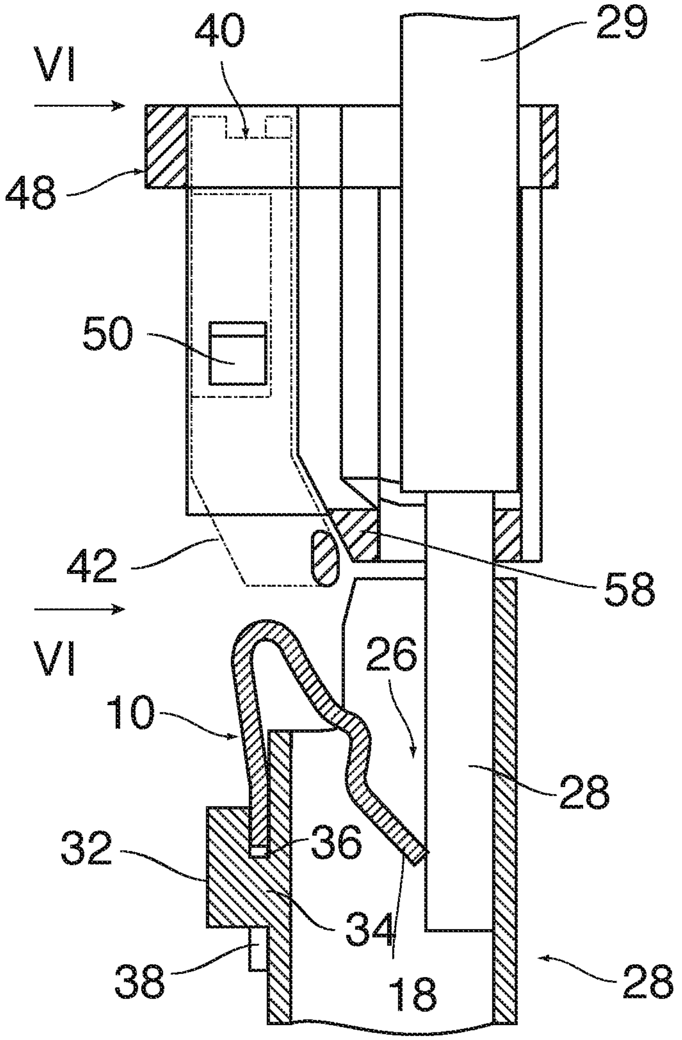
FIG. 5 shows an axial section of the contact spring arrangement with an electrical conductor clamped by the contact spring.

FIG. 5 shows the contact spring arrangement in a state in which the conductor 28 has been inserted through the cable guide of the guide body 48 into the plug socket 26 and has bent back the clamping limb 18 of the contact spring 10. When the conductor is inserted, the contact spring 10 is then prevented from being entrained downwardly thereby, no later than when the projection 34 has reached the upper end of the slot 36. After the free end of the conductor 28 has passed the end of the clamping limb 18, the clamping limb 18 with its lower edge in FIG. 5 digs into the peripheral wall of the copper core. If an attempt is now made to pull back the conductor 28 upwardly, the clamping limb 18 has the tendency to pivot upwardly and at the same time to constrict the plug socket further so that the conductor is held in the clamped position in a self-locking manner.

Figure 6:
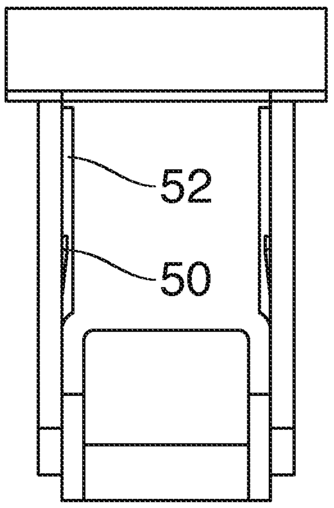
FIG. 6 shows a view of the guide body and of the release member from the direction of the arrows VI-VI in FIG. 5.

The release member 40 is shown in FIG. 5 for illustration purposes in its maximum raised position. A further upward movement is prevented by the actuation arm 42 bearing against the undercut 58. The latching lugs 50, however, in this position also are still at a certain spacing from the lower edges of the receiving recesses (see also FIG. 6).

If the user would like to release the conductor 28 from the plug socket 26, the user inserts a screwdriver blade or a different tool from above into the guide duct 46 of the guide body 48 and pushes the release member 40 downwardly so that this release member pushes with its spring contact bar 56 onto the clamping limb 18 and bends this back further so that the edge at the free end of the clamping limb releases the conductor 28 again.

Figure 7:
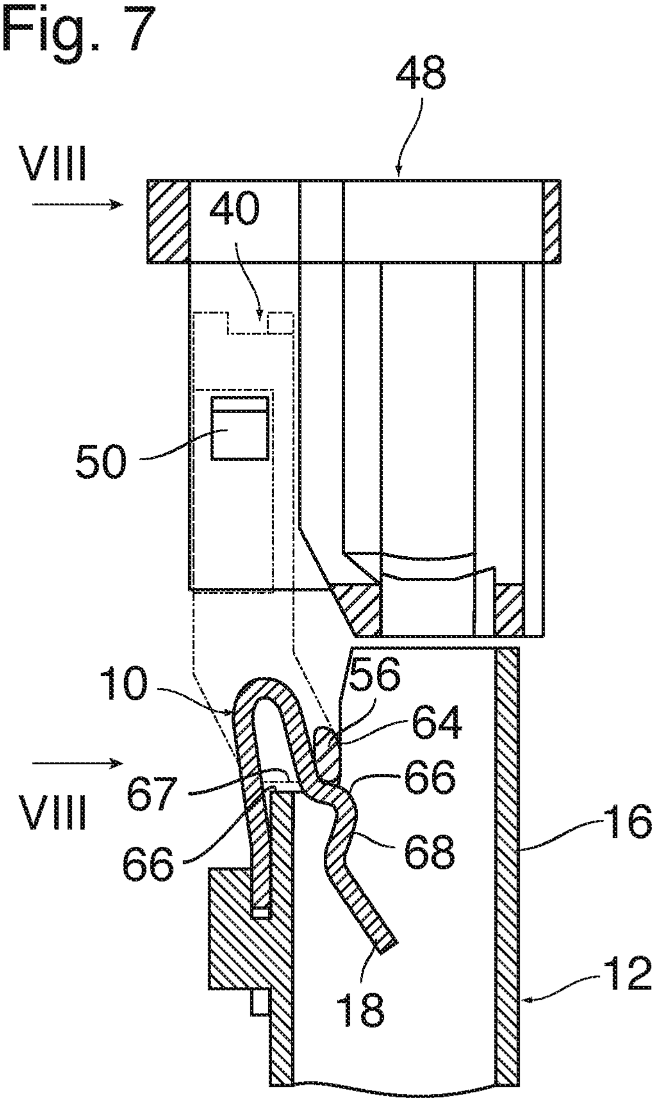
FIG. 7 shows an axial section through the contact spring arrangement in a maximum open state.
Figure 8:
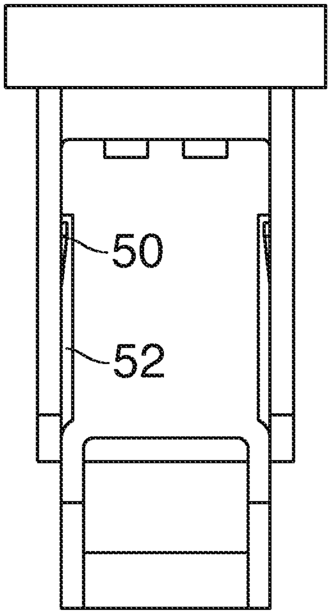
FIG. 8 shows a view of the guide body and the release member from the direction of the arrows VIII-VIII in FIG. 7.

FIGS. 7 and 8 show the state in which the conductor 28 has been pulled out again and the release member 40 has reached its lowest end position in which the stop edges 67 at the ends of the fork arms of the actuation arm bear against the stop 66.

In this manner, the movement play of the release member 40 is limited such that the contact spring 10 is reliably prevented from excessive bending and thus overstretching and weakening.

In the example shown, the clamping limb 18 of the contact spring forms a protrusion 68 at the point at which in FIG. 7 the spring contact bar 56 acts on the clamping limb. This has the advantage that the resilient restoring force, which the contact spring 10 exerts on the lower edge of the spring contact bar 56, has a very large vertical component and barely any horizontal component, so that the release member 40 is pushed back reliably and without tilting into its initial position again when the contact spring 10 springs back into its neutral position.

The invention claimed is:

1. A contact spring arrangement, comprising:

a carrier structure (12) made of a conductive material, the carrier structure (12) having a support wall (24);

a contact spring (10) having a base limb (20) held in a fixed position with respect to the support wall, and a clamping limb (18); and a release member (40) which is guided displaceably in a guide body (48) in an insertion direction with respect to the support wall, wherein the clamping limb (18) and the support wall jointly form a plug socket (26) narrowing in the insertion direction for a core (28) of an electrical conductor, wherein the release member (40) has an actuation arm (42), wherein the actuation arm (42), in a release position, engages on a flank of the clamping limb (18) facing towards the plug socket (26) and holds the clamping limb, counter to a spring force, in a position bent back towards the base limb (20), wherein the carrier structure (12) forms a stop (66) which limits a range of movement of the release member (40) in the insertion direction, wherein the actuation arm (42) of the release member (40) has two fork arms, wherein the two fork arms are connected together at free ends by a spring contact bar (56) and encompass an apex of the contact spring (10), and wherein the stop (66) is located in a movement path of the free ends of the fork arms and cooperates with stop edges (67) at the free ends of the fork arms.

2. The contact spring arrangement as claimed in claim 1, wherein the clamping limb (18) has a protrusion (68) at a point at which the actuation arm (42) acts on the clamping limb when the release member is in its stop position on the stop (66), the protrusion exerting a force on the release member counter to the insertion direction.

3. The contact spring arrangement as claimed in claim 1, wherein the carrier structure (12) forms a cage (16) and wherein the stop (66) is formed by edges of side walls of the cage adjoining the support wall (24).

4. The contact spring arrangement as claimed in claim 3, wherein the cage (60) consists of conductive material and forms a busbar.

5. The contact spring arrangement as claimed in claim 3, wherein the side walls of the cage (16) forming the stop (66) have a stepped contour and form a guide (64) for the actuation arm (42).

* * * * *